United States Patent [19]

Zheng et al.

[11] Patent Number: 5,409,526
[45] Date of Patent: Apr. 25, 1995

[54] APPARATUS FOR SUPPLYING HIGH PURITY FLUID

[75] Inventors: Dao-Hong Zheng, London; John Irven, High Wycombe; Alan J. F. Paterson, Crewe; Daniel C. Tregear, Cambridge, all of United Kingdom

[73] Assignee: Air Products and Chemicals, Inc., Allentown, Pa.

[21] Appl. No.: 132,541

[22] Filed: Oct. 5, 1993

[30] Foreign Application Priority Data

Oct. 6, 1992 [GB] United Kingdom ............... 9220975

[51] Int. Cl.$^6$ ............................................. B01D 53/04
[52] U.S. Cl. ...................................... 96/132; 96/137; 96/147; 55/385.4; 55/417
[58] Field of Search .................. 96/108, 131, 132, 134, 96/137, 138, 147, 154; 55/385.4, 417, 432

[56] References Cited

U.S. PATENT DOCUMENTS

| | | | |
|---|---|---|---|
| 1,821,549 | 9/1931 | Hornor et al. | 55/417 X |
| 2,031,164 | 2/1936 | Johnson | 96/147 |
| 2,284,147 | 5/1942 | Herrick | 96/147 X |
| 2,548,335 | 4/1951 | Balogh | 96/147 |
| 2,722,105 | 11/1955 | Keyes | 96/134 X |
| 3,169,112 | 2/1965 | Nelson | 96/131 X |
| 3,976,050 | 8/1976 | Glasser et al. | 96/131 X |
| 4,032,311 | 6/1977 | Bohmrich et al. | 55/385.4 |
| 4,146,277 | 3/1979 | Santoro | 96/134 |
| 4,483,461 | 11/1984 | Igarashi | 55/385.4 X |
| 5,041,147 | 8/1991 | Knize et al. | 96/131 |
| 5,238,469 | 8/1993 | Briesacher et al. | 96/108 X |

FOREIGN PATENT DOCUMENTS

| | | | |
|---|---|---|---|
| 129169 | 1/1978 | Germany | 96/132 |
| 55-039208 | 3/1980 | Japan | 96/108 |
| 62-161095 | 7/1987 | Japan | 96/108 |
| 63-051918 | 3/1988 | Japan | 96/137 |
| 2078128 | 1/1982 | United Kingdom | 96/132 |
| WO86/07553 | 12/1986 | WIPO | 96/134 |

*Primary Examiner*—Robert Spitzer
*Attorney, Agent, or Firm*—James C. Simmons

[57] ABSTRACT

An apparatus for supplying high purity gas comprises a cylinder having a valve with two internal ports. One internal port is used to fill the cylinder while the other is fitted with a unit which removes particulates and impurities from the gas as it leaves the cylinder. The unit comprises an inlet, a first filter for removing coarse particulates, layers of adsorbent and absorbent for removing impurities, and a second filter for removing fine particulates. The purified gas leaves the cylinder via the valve and after passing through a regulator, a flow control device and various lengths of tubing passes through a conventional purifier immediately upstream of the point of use. The apparatus reduces the load on the purifier and hence decreases the frequency at which the purifier has to be recharged. Potentially the apparatus could obviate the need for the purifier altogether.

5 Claims, 4 Drawing Sheets

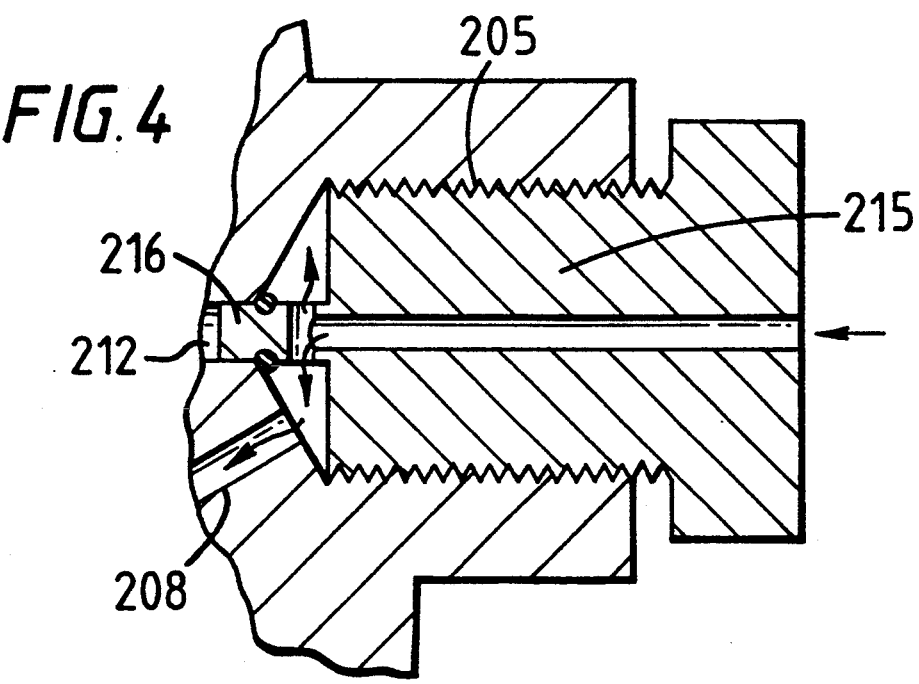
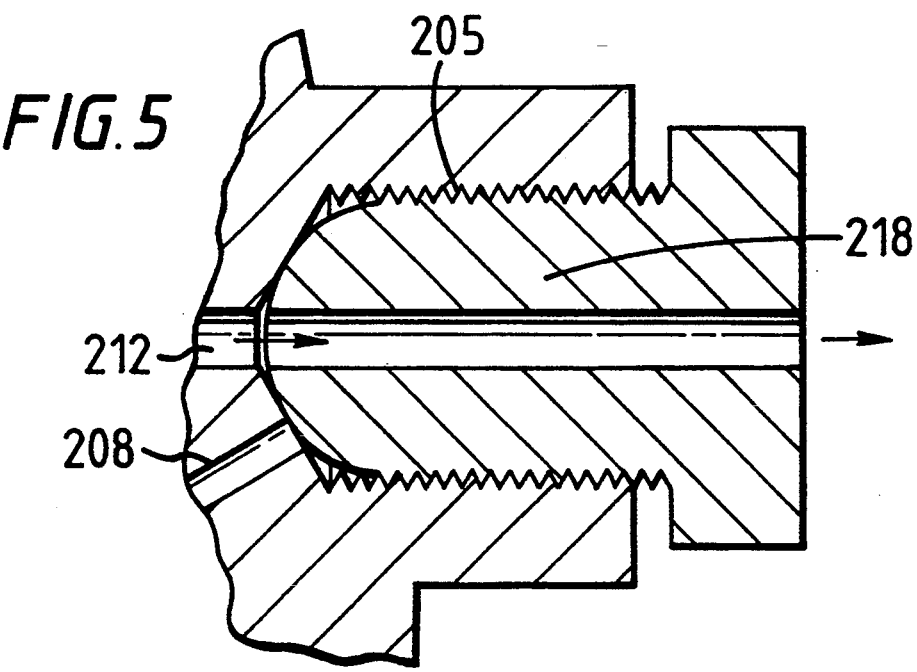

APPARATUS FOR SUPPLYING HIGH PURITY FLUID

FIELD OF THE INVENTION

This invention relates to an apparatus for supplying high purity fluid and, more particularly but not exclusively, to an apparatus for supplying high purity gas.

BACKGROUND OF THE INVENTION

Many commercial processes, particularly in the electronics industry, require high purity gases and gas mixtures, i.e., gases and gas mixtures which are substantially free from one or more unwanted components (hereinafter referred to as "impurities"). In many applications the high purity gases and gas mixtures must contain less than a total of 50 parts per million (ppm) nitrogen, oxygen, carbon monoxide, carbon dioxide, hydrocarbons and water. In other applications the only requirement may be that the high purity gas mixture contains less than a few parts per million of a specific impurity, for example water. In these cases the presence of small quantities of other gases may be unobjectionable.

More recently even more stringent specifications have been set down requiring less than several parts per billion ($10^9$) impurities.

In order to provide such high purity gases it is conventional to store the gases (or the liquefied gas) in specially prepared cylinders, the inner surfaces of which have been highly polished and which are typically purged, evacuated and baked before use. However, even with such care it is still necessary to provide a purifier immediately upstream of the point of use. This purifier will typically operate at about 2 bar gauge.

Existing purifiers contain a selection of proprietary materials and have to be returned to the manufacturer for the old material to be removed and new material to be loaded at frequent intervals. The proprietary material is not sold separately and obtaining a recharged unit is very expensive. Furthermore, the purifier itself has to be manufactured to very high standards to prevent the ingress of impurities from the atmosphere and is thus itself very expensive.

It will be appreciated that the overall cost of operations could be decreased by ensuring that the gas leaving the cylinder is as pure as practicable, thereby reducing the duty on the purifier or potentially obviating the need for a purifier altogether.

U.S. Pat. No. 4,032,311 discloses the concept of providing a filter in a compressed air tank for use in diving. The filter is mounted on the inlet of the control valve on the tank and prevents flakes of rust from the tank or particulates introduced by the compressor during filling from entering the diver's pressure regulator. This prior art is not concerned with the supply of high purity fluid.

SUMMARY OF THE INVENTION

According to the present invention there is provided an apparatus for supplying high purity fluid, which apparatus comprises a cylinder having a valve and means in said cylinder for removing impurities from said fluid, said means comprises one or more adsorbents and/or absorbents.

Advantageously, said adsorbent comprises a molecular sieve.

Preferably, said absorbent comprises a getter and/or a metal-organic compound.

Advantageously, said means also comprises a catalyst to enhance the operation of the adsorbent and/or absorbent.

If desired, the means could simply be placed in said cylinder. However, preferably said means comprises a unit attached to said valve.

The present invention has very significant economic impact. In particular, conventional purifiers operate in air which typically contains 10,000 ppm $H_2O$. Since less than 1 ppb $H_2O$ is often required in high purity gas great care has to be taken in the construction of purifiers to inhibit the ingress of impurities. However, high purity gas inside a high purity gas cylinder rarely contains more than 1 ppm $H_2O$ and consequently the means inside the cylinder for removing impurities to the ppb level can be far more simply constructed, possibly for less than 5% of the cost of conventional purifiers.

Preferably, said unit comprises a first particle filter.

Advantageously, said first particle filter is adapted to remove particles having a diameter greater than 5 microns.

Preferably, said unit comprises a second particle filter.

Advantageously, said second particle filter is adapted to remove particles having a diameter greater than 0.5 microns.

Particularly advantageously, said second particle filter is adapted to remove particles having a diameter greater than 0.02 microns.

Preferably, said first and/or second filter are made of a porous sintered material.

Preferably, said unit is arranged so that, in use, gas passes through said first filter, then through one or more of said adsorbent and absorbent, (which are preferably arranged in layers), and then through said second filter prior to leaving said cylinder.

Since the unit is enclosed within the cylinder it does not have to withstand any substantial pressure differential and can thus be made of relatively light gauge material.

Typically, the pressure in the cylinder will initially be at about 200 bar and, at this pressure, many adsorption processes proceed more rapidly and more efficiently than in a purifier working at 2 bar.

Whilst the unit may well remove impurities to the required level, it should be recalled that the gas will normally have to pass through a pressure regulator, tubing and flow control equipment downstream of the cylinder and consequently the need for a purifier immediately upstream of the process area may remain. However, the duty of such purifier may be significantly reduced.

Preferably, said valve has two internal ports and said unit is attached to one of said internal ports.

In more preferred embodiments of the invention, the valve comprises a first internal port which opens into said cylinder, and a second internal port which is connected to said unit, an external port through which said cylinder can be filled and emptied, a filling valve member for permitting and preventing gas flowing from said external port to said first internal port and a discharge valve member for permitting and preventing gas flowing from said second internal port to said external port.

Preferably, said apparatus also includes a filling adaptor which, when inserted in said external port prevents gas flowing from said external port to said second internal port.

Advantageously, said apparatus also includes a discharge adaptor which, when inserted in said external port prevents gas flowing from said first internal port to said external port.

For a better understanding of the invention reference will now be made, by way of example, to the accompanying drawings, in which:

DESCRIPTION OF THE DRAWINGS

FIG. 4 is a cross-section through a filling adaptor for use with the apparatus shown in FIG. 3; and FIG. 5 is a cross-section through a discharge adaptor for use with the apparatus shown in FIG. 3.

DETAILED DESCRIPTION OF THE PREFERRED EMBODIMENTS

Figure 1:
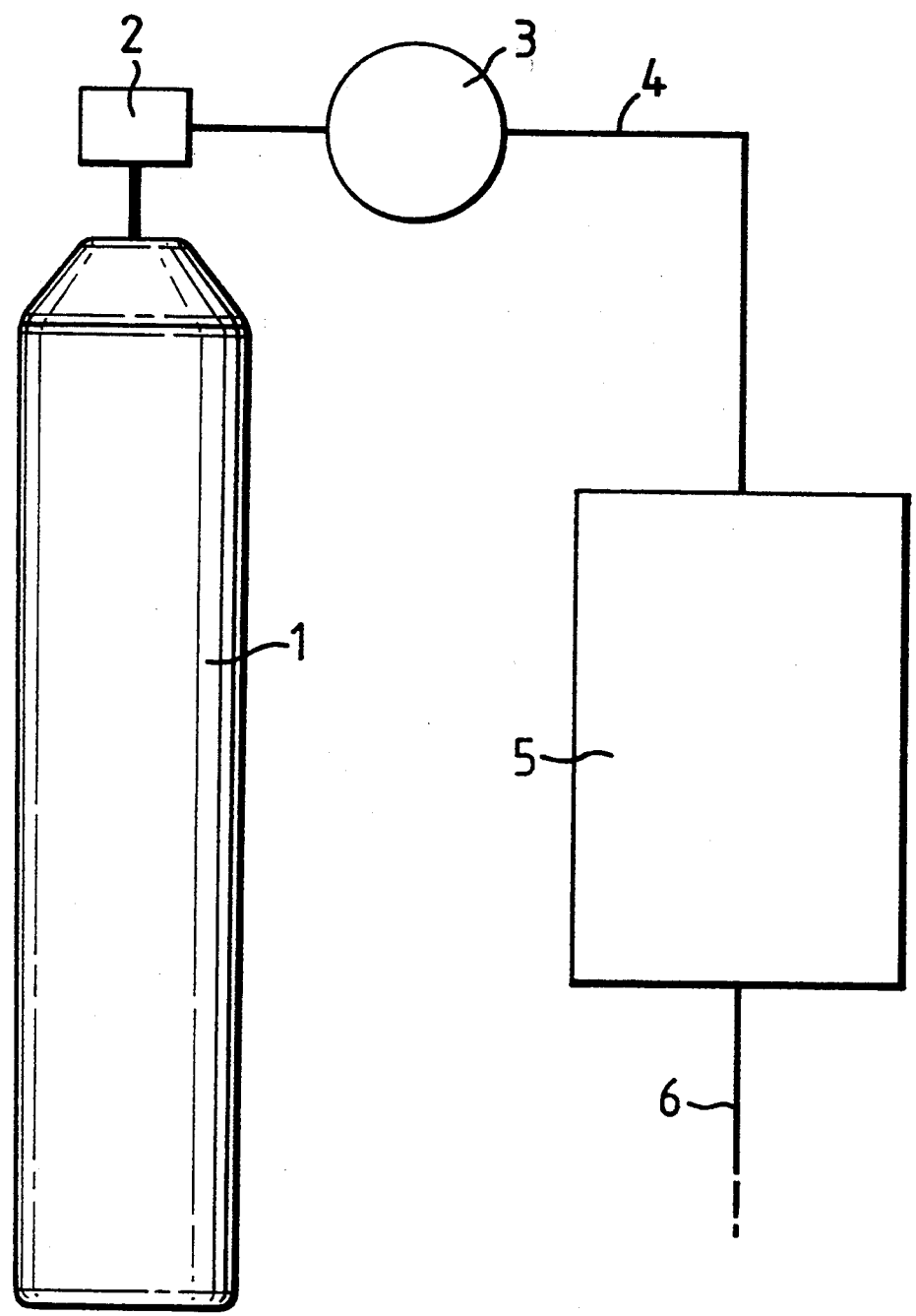
FIG. 1 is a simplified view of a known apparatus for supplying high purity gas.

Referring to FIG. 1 of the drawings, there is shown a known apparatus for supplying high purity gas. The apparatus comprises a cylinder 1, the inside of which has been highly polished and is filled with an ultra high purity gas. Even though the cylinder 1 was purged, evacuated and baked before filling, tiny amounts of atmospheric impurities remain in the wall and enter the gas together with particulates and possible impurities from the valve 2.

A pressure reducing valve 3 is fitted downstream of the valve 2 and a length of tubing 4 leads to a purifier 5 (for example as manufactured by Saes Getters (GB) Ltd. of London) containing proprietary materials for removing the particulates and impurities to the desired level. The high purity gas then passes through pipe 6 into the unit where it is to be used (not shown).

Figure 2:
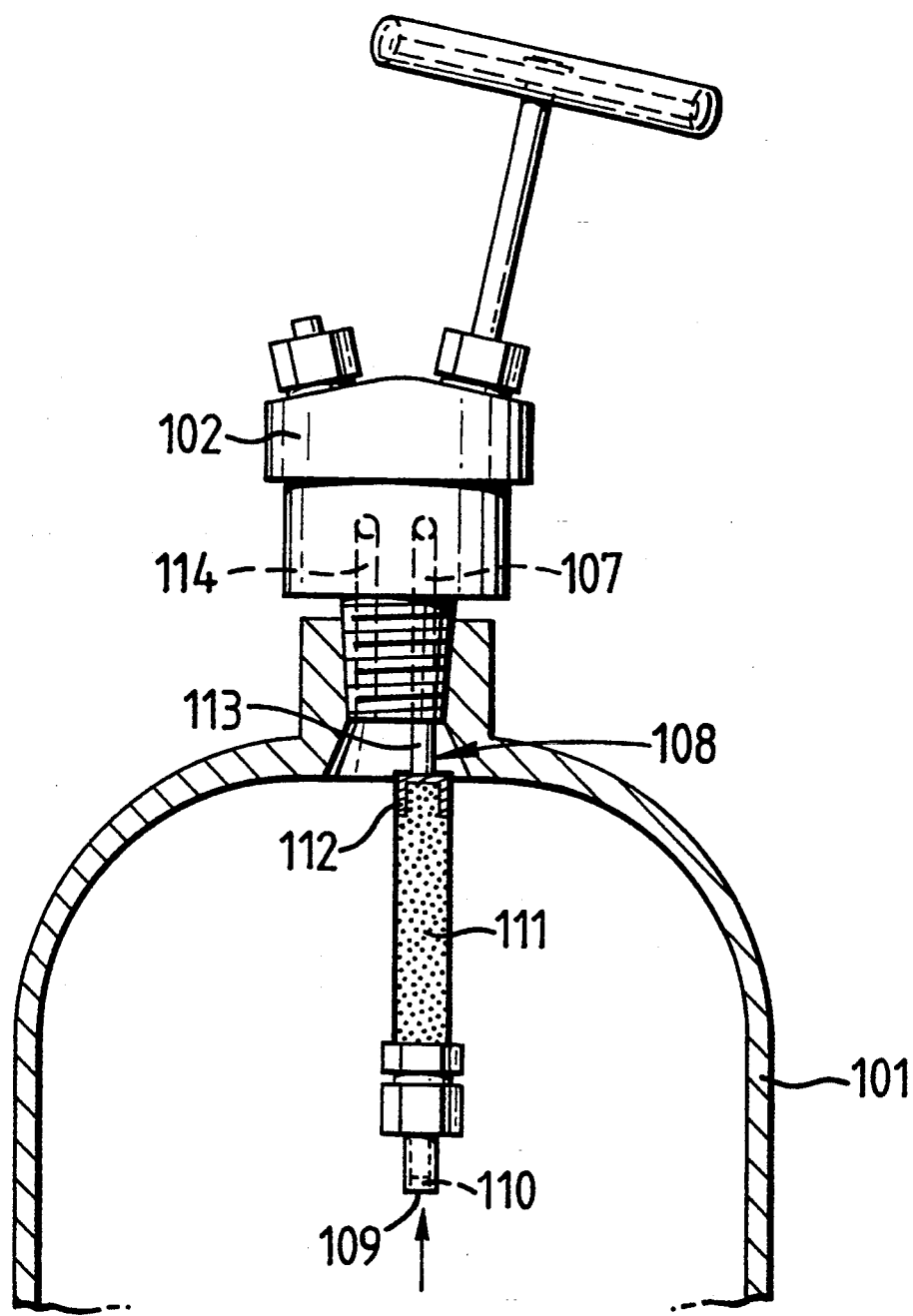
FIG. 2 is a simplified cross-section through one embodiment of an apparatus in accordance with the present invention.

Referring now to FIG. 2, there is shown a top of a cylinder 101 which is provided with a double port valve 102. One of the internal ports 107 is provided with a unit 108 which extends into the cylinder 101 and has an inlet 109.

The unit 108 comprises a first filter 110 which is positioned adjacent the inlet 109 and is designed to remove particles having a diameter greater than 15 microns. A suitable filter is sold by the Cajon Company of 9760 Shepherd Road, Macedonia, Ohio 44056, USA as Part No. SS-4-VCR-2-5M)

Above the first filter 110, the unit 108 contains a mixture of zeolites and getters 111. A second filter 112 is mounted adjacent the outlet 113 of the unit 108 and is capable of removing particles having a diameter greater than 0.5 microns. A Cajon filter and gasket Part No. SS-4-VCR-2-. 5M was used for test purposes.

Since high purity gases are normally only required at relatively low flow rates, for example 0.34 l/s the pressure drop across the unit 108 in use is normally quite low and consequently the unit 108 only has to be constructed to withstand a few bars pressure, for example up to 20 bar.

Furthermore, since the gas in the cylinder is unlikely to have any appreciable quantity of impurities the unit 108 can be relatively simply and inexpensively constructed compared with conventional purifiers which operate in air and where considerable (and expensive) precautions have to be taken to prevent the ingress of impurities into the high purity gas.

It will be appreciated that any attempt to refill an empty cylinder via the unit 108 would provide difficulties. Firstly, filling could only progress very slowly to prevent the unit 108 being damaged by the high supply pressure. Secondly, any particulates entrained in the feed gas would be deposited on the second filter 112 and blown out of the cylinder 101 in normal use. A further problem which arises is how to deal with a cylinder 101 if the unit 108 becomes blocked whilst the cylinder 101 is substantially full of gas.

By employing a two port valve 102 having two passageways, the cylinder 101 ,can be refilled via the port 114. Similarly, gas can be exhausted from the cylinder 101 via port 114 should the unit 108 become blocked.

In initial tests we have concentrated on removing particulates and moisture from industrially pure nitrogen. The mixture is relatively easy and inexpensive to remove to a few ppb using type 4A zeolite and significantly reduce the loading of the downstream purifier thereby significantly increasing its operating time.

It will be appreciated that whilst the majority of purification occurs as the gas flows out of the cylinder, purification will also occur during storage as the gas diffuses into and out of the unit 108. Thus, theoretically, the unit 1.08 could simply be placed in the cylinder 101 and not attached to the valve 102. However, it is strongly recommended that the unit 108 should be attached to the valve 102 to ensure that the gas leaving the cylinder has passed through the unit 108.

Whilst the apparatus described in FIG. 2 works quite satisfactorily many gases, particularly those used in the electronics industry, are highly toxic. Whilst the staff in these industries are highly skilled there is always a risk that someone will inadvertently open the port used to refill the cylinder thus releasing toxic gases to atmosphere. Whilst it is possible to fit tamper-resistant seals to deter people opening the wrong port accidents can still happen.

Figure 3:
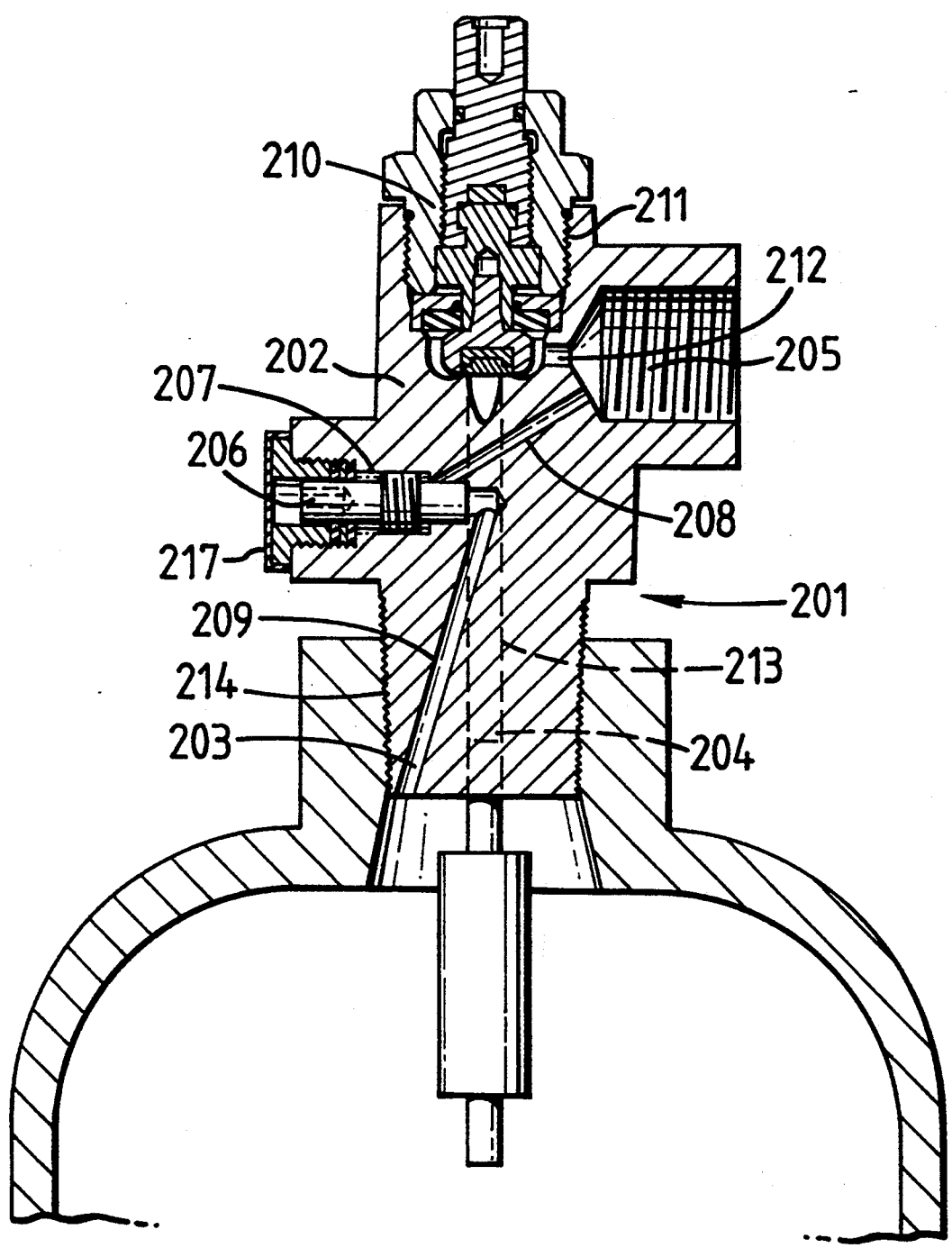
FIG. 3 is a simplified cross-section through a second embodiment of an apparatus in accordance with the invention.

FIG. 3 shows an apparatus in accordance with the invention fitted with a cylinder valve intended to reduce this problem.

Referring to FIG. 3 of the drawings, there is shown a cylinder valve which is generally identified by the reference numeral 201.

The cylinder valve 201 comprises a body 202 having a first internal port 203, a second internal port 204 and an external port 205.

A filling valve member 206 is threadedly mounted in a bore 207 in the body 202 and; in the position shown, prevents gas flow between the external port 205 and the first internal port 203 via a passageway formed by bore 208 and bore 209.

A discharge valve member 210 is threadedly mounted in a bore 211 in the body 202 and, in the position shown, prevents gas flow between the external port 205 and the second internal port 204 via bore 212 and bore 213.

A unit (similar to unit 108 in FIG. 2) is attached to the second internal port 204 and the whole assembly is fitted into a cylinder to which the valve 201 is threadedly attached via neck 214.

In order to fill the cylinder the filling adaptor 215 shown in FIG. 4 is screwed into the external port 205. The tip 216 of the filling adaptor 215 enters and obstructs the bore 212. Filling valve 206 is then opened and the cylinder is first: evacuated via bores 209 and 208. It is then filled with the required gas via bores 208 and 209.

It will be noted that during the filling operation the bore 212 is isolated from the supply of high pressure gas so that even if discharge valve member 210 is inadvertently left open high pressure gas will not be admitted to the interior of the unit.

At the completion of filling, filling valve member 206 is closed and filling adaptor 215 is removed. (Discharge valve member 210 should be closed.) A security seal may then be placed over the gland nut 217 to deter tampering with the filling valve member 206.

After delivery., the customer mounts a pressure regulator on the external port 205 via a discharge adaptor 218 (FIG. 5). The discharge adaptor 218 communicates with bore 212 and closes bore 208. Once the pressure regulator is properly connected the customer opens discharge valve member 210 to allow gas in the cylinder to flow through the unit to the pressure regulator via second internal port 204 and bores 213 and 212.

If filling valve member 206 is tampered with and/or inadvertently opened the flow of gas from the cylinder will be stopped by the discharge adaptor 218.

It should be noted that it is not essential that the discharge adaptor 218 blocks the bore 208 since there will normally be a guard purifier downstream of the pressure regulator. However, blocking is highly desirable.

Various modifications to the arrangements described are envisaged, for example a check valve may be provided to prevent gas entering the unit from the valve.

Although a molecular sieve was used in our initial tests it is envisaged that the final unit will contain layers of adsorbent and absorbent.

What is claimed is:

1. An apparatus for supplying high purity fluid, which apparatus comprises a cylinder having a valve, said valve adapted to close said cylinder and having means for filling and removing fluid from said cylinder via two internal ports connected to said means for filling and removing of fluid, and a unit connected to one of said ports said unit containing a substance selected from the group consisting of adsorbents, absorbents and mixtures thereof, whereby impurities are removed from said fluid as it is withdrawn from said cylinder through said unit.

2. An apparatus as claimed in claim 1, including a catalyst to enhance the operation of said means.

3. An apparatus as claimed in claim 1 wherein the second of said two internal ports opens directly into said cylinder and which apparatus further comprises a filling valve member for permitting and preventing fluid flowing from said means for filling and removing of fluid to the second of said two internal ports and a discharge valve member for permitting and preventing fluid flow from the first of said two internal ports to said means for filling and removing of fluid.

4. An apparatus as claimed in claim 3 which further comprises a filling adaptor which, when inserted in said means for filling and removing of fluid, prevents fluid from flowing from said means for filling and removing of fluid to the first of said two internal ports.

5. An apparatus as claimed in claim 3 which further comprises a discharge adaptor which, when inserted in said means for filling and removing of fluid, prevents fluid from flowing from the second of said two internal ports to said means for filling and removing of fluid.

* * * * *